(12) United States Patent
Louter

(10) Patent No.: US 7,163,710 B2
(45) Date of Patent: Jan. 16, 2007

(54) EMULSION COMPRISING A NUT PASTE

(75) Inventor: Arjan Johannes Louter, Delfgauw (NL)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 283 days.

(21) Appl. No.: 10/869,401

(22) Filed: Jun. 16, 2004

(65) Prior Publication Data

US 2005/0281939 A1    Dec. 22, 2005

(51) Int. Cl.
*A23L 1/38* (2006.01)

(52) U.S. Cl. ............... 426/633; 426/466; 426/523; 426/602

(58) Field of Classification Search ........... 426/633, 426/602, 466, 523
See application file for complete search history.

(56) References Cited

U.S. PATENT DOCUMENTS

| | | | |
|---|---|---|---|
| 2,131,064 A | 9/1938 | Musher | |
| 4,661,360 A | 4/1987 | Smith | |
| 6,773,744 B1 * | 8/2004 | Ward et al. | 426/659 |
| 2005/0170053 A1 * | 8/2005 | Milani et al. | 426/414 |

FOREIGN PATENT DOCUMENTS

| | | |
|---|---|---|
| EP | 0 407 347 | 1/1991 |
| FR | 2 828 378 A | 2/2003 |
| WO | 02/34054 | 5/2002 |
| WO | 02/102169 | 12/2002 |

OTHER PUBLICATIONS

European Search Report on Application No. 05 07 6384 dated Aug. 25, 2005.
Database WPI Section Ch. Week 200344, Derwent Publications Ltd., XP002340266 & JP 2002 354984 A.

* cited by examiner

*Primary Examiner*—Helen Pratt
(74) *Attorney, Agent, or Firm*—Michael P. Aronson

(57) ABSTRACT

A process for the preparation of a bake stable nut butter emulsion which comprises the following steps (a) selecting a sugar syrup solution and diluting it with water until it contains an amount of sugar solids which is in the range 55–80 wt. %, (b) heating the solution to a temperature in the range 40–100° C., (c) dispersing a starch into the heated solution until it contains 1–5 wt. % of dissolved starch, (d) dispersing an emulsifier into the heated solution until it contains 0.5–3 wt. % of dissolved emulsifier, (e) dispersing a gelling agent into the heated solution until it contains 0.2–1 wt. % of dissolved gelling agent, (f) cooling the heated solution into which the starch, emulsifier and gelling agent have been dispersed to a temperature which is in the range of 20–50° C., (g) dispersing under vigorous stirring conditions a nut butter into the cooled solution, while controlling the rate of addition such that the resulting emulsion remains water continuous, (h) allowing the emulsion to cool and to obtain a plastic consistency. The process delivers an edible nut butter containing emulsion which comprises 10–25 wt. % of a dispersed fat phase and 75–90 wt. % of a continuous aqueous phase which comprises sugar solids, starch, gelling agent and emulsifier, which emulsion has a plastic consistency and which emulsion possesses bake stability. The invention also relates to a bake stable nut butter emulsion.

5 Claims, No Drawings

EMULSION COMPRISING A NUT PASTE

TECHNICAL FIELD

The present invention aims at the manufacture of an emulsion prepared from a nut paste which exhibits bake stability and which is suitable for use as a snack filling. The invention also aims at the manufacture of baked snacks having a creamy nut butter filling.

BACKGROUND AND PRIOR ART

Baked cereal bars are popular snacks which are sold in many varieties. The present invention deals with a product which is suitable for the manufacture of baked cereal bars consisting of a jacket of baked dough which surrounds a filling prepared with a nut paste which paste will be denoted also as nut butter in this patent specification. The nut paste preferably is peanut butter. Such kind of snack is described in WO 02/34054. When the filling consists of untreated peanut butter, snacks could not be properly prepared by a process of co-baking the dough jacket and the filling. At the prevailing baking temperature the peanut butter would deteriorate and fully liquefy, causing soaking the dough and even leakage from the jacket. Moreover the nut butter taste of the baked snack is seriously affected. A brittle, flaky and grainy filling with a poor flavour will result. The considerable difference in the water activities of common bread dough and untreated peanut butter causes undesired moisture migration and subsequent deterioration of the snack. A suitable but expensive solution consists in extruding a nut butter filling into an already baked hollow dough jacket. Several methods are known from the prior art for imparting bake stability to a snack filling prepared with peanut butter so that it can be co-baked with the dough jacket. U.S. Pat. No. 4,661,360 e.g. describes how a peanut butter filling containing 40–70 wt. % of fat can be imparted bake stability by surrounding it with a hydrophilic coating of corn syrup.

This method, however, like the other prior art methods requires processing which is too complex for industrial scale production and/or needs relatively expensive auxiliary ingredients. It is difficult to have the filling after baking retain the desired creamy texture characteristic of peanut butter. The complexity of the manufacturing process and/or the poor quality of the final product are the cause that baked snacks with a peanut butter filling, although having a high consumer appeal, are not commercially available presently.

SUMMARY OF THE INVENTION

A simple and cheap process has been found for processing nut butter to such effect that the nut butter acquires the stability necessary for being co-baked with a surrounding dough. The found process results in an edible nut butter containing emulsion which comprises 10–25 wt. % of a dispersed fat phase and 75–90 wt. % of a continuous aqueous phase which comprises sugar solids, starch, gelling agent and emulsifier, which emulsion has a plastic consistency and which emulsion possesses bake stability.

The invention also comprises the emulsion and a process for the manufacture of snacks with a nut butter filling.

DETAILS OF THE INVENTION

The present invention provides a process for preparing a bake stable snack filling which comprises a nut butter.

The found process for the preparation of the bake stable nut butter emulsion comprises the following steps:

(a) selecting a sugar syrup solution and diluting it with water until it contains an amount of sugar solids which is in the range 55–80 wt. %,
(b) heating the solution to a temperature in the range 40–100° C.,
(c) dispersing a starch into the heated solution until it contains 1–5 wt. % of dissolved starch,
(d) dispersing an emulsifier into the heated solution until it contains 0.5–3 wt. % of dissolved emulsifier,
(e) dispersing a gelling agent into the heated solution until it contains 0.2–1 wt. % of dissolved gelling agent,
(f) cooling the heated solution into which the starch, emulsifier, and gelling agent have been dispersed to a temperature which is in the range of 20–50° C.,
(g) dispersing under vigorous stirring conditions a nut butter into the cooled solution, while controlling the rate of addition such that the resulting emulsion remains water continuous,
(h) allowing the emulsion to cool and to obtain a plastic consistency. Steps (c), (d) and (e) can be performed in any order subsequent to step (b) and before step (f).

By heating the nut butter to a temperature which is in the range of 20–70° C. it obtains a pourable consistency which facilitates dispersing it into the aqueous solution. It is vital that the nut butter is added to the aqueous phase at such low rate that water continuity of the resulting emulsion is maintained. Water continuity can be easily monitored by measuring the electrical conductivity of the emulsion. As long as it shows a conductivity >800 µS the emulsion is water continuous. It has appeared that water continuity is preserved when the rate of nut butter addition does not exceed 10 wt. % of the total amount of nut butter per minute. The final emulsion when cooling down thickens and obtains a plastic consistency. Then it can suitably be surrounded by a piece of the jacket dough, e.g. by coextrusion of dough and filling.

The invention also comprises an edible water continuous emulsion which comprises nut butter dispersed into an aqueous phase which contains sugar, starch, gelling agent and emulsifier, which emulsion has a plastic consistency and which possesses bake stability.

Generally, commercial sugar syrup, starches, gelling agents and emulsifiers can be used. Although these vary in properties and quality, the skilled man will easily find by some trials suitable concentrations for the selected sugar syrup, starch, gelling agent and emulsifier.

Preferably, the concentrations of sugar solids, starch, gelling agent and emulsifier in the aqueous phase of the emulsion are selected from the following ranges: sugar solids 55–80 wt. %, starch 1–5 wt. %, emulsifier 0.5–3 wt. % and gelling agent 0.2–1 wt. %. Preferably the gelling agent is applied in a concentration as advised by the manufacturer for obtaining good bake stability.

The amount of nut butter to be incorporated into the emulsion product is chosen such that the total amount of fat in the final emulsion is in the range 10–25 wt. %.

The minimum value of 10 wt. % of fat helps to maintain the desired creaminess.

Definitions

A nut paste essentially consists of a spreadable paste of ground nut with optional further ingredients. Peanut butter is the most popular nut paste. It is the nut butter preferably used for this invention, but other nut butters can be employed as well.

Peanut butter when used as a bread spread usually contains some extra oil and some structuring fat, e.g. hydrogenated palm oil. The presence of structuring fat prevents oil exudation. Peanut butter often contains small amounts of sugar and salt for taste reasons.

Bake stability means that after baking of the snack the filling still possesses a plastic consistency and a pleasant nut flavour and does not exhibit oil exudation.

Sugar syrup is a preferred ingredient of the invented emulsion. Sugar syrup is a commodity food ingredient which is obtained by enzymatic hydrolysis of a starch containing raw material, such as corn. The syrup contains sugar solids which comprise mono- and disaccharides and a substantial amount of oligosaccharides. The composition of the syrup varies according to the nature of the starting starch and the extent of hydrolysis. Sugar syrup is specified by its solids content and its dextrose equivalent (DE) value which is in the range 20–73. The DE-value is proportional to the extent of hydrolysis. For the present invention a sugar syrup having a (DE)-value selected from the range 20–65 is preferred.

Before preparing the emulsion product from a concentrated sugar syrup it should be diluted with water until the amount of sugar solids is in the range 55–80 wt. %.

Sugar solids may include any of the mono-, di- and/or oligosaccharides which are present in sugar syrups.

For preparing the nut butter emulsion any starch may be used, provided its amylose content is in the range 15–70%. A starch having an amylose content in the range 15–30%, e.g. tapioca starch, is preferred.

The emulsifier is selected preferably from the group consisting of stabilised egg yolk, partial glycerides, lecithin and mixtures of these.

As gelling agent any gelling agent or mixture of gelling agents may serve, provided it is able to increase the viscosity of a water continuous nut butter emulsion to a value in the range 6000–8000 cP. The presence of a proper gelling agent also ensures form stability of the filling during baking. Gelling agents preferably are chosen from the group consisting of xanthan gum, carrageenan, locust bean gum, guar gum, modified celluloses, low-esterified pectines in combination with a calcium salt, fibres and mixtures of those gelling agents. However, the skilled man easily will find suitable substitutes not contained in this list, with which the desired plastic consistency of the nut butter emulsion also can be realized. For the preparation of bake stable snack fillings suitable commercial gelling agents are on the market, such as mixtures of locust bean gum and xanthan gum.

The dough which can serve as the snack jacket suitably is an ordinary bread dough and is prepared with the usual ingredients of such dough. These ingredients essentially comprise flour, water and a leavening agent. The ingredients are mixed and kneaded to a homogeneous dough using standard procedures. In order to control moisture migration it is desirable to adjust the water activities ($A_w$) of the dough as well as of the filling to a value in the range 0.6 to 0.8 and preferably so, that values of dough and filling differ less than 0.05 units.

Preferably auxiliary agents are added to the dough such as baking fat and a hydrocolloid (e.g. an alkylated cellulose) for water binding in order to obtain an optimum water activity.

The dough is combined with the filling using a method as known in the art of filled baked snacks, e.g. by coextruding dough and filling.

Then the pieces of filled dough are baked at a temperature and for a time which are selected preferably from the ranges 175 to 250° C. and for 2 to 15 minutes.

Various varieties of the present nut butter snack may be obtained, e.g. by introducing a twin filling comprising besides the nut butter a filling consisting of fruit jelly which fruit jelly which contains 10–100 wt. % of fruity matter.

All percentages in the present specification are weight percentages unless specified otherwise and are calculated on total emulsion.

The following examples will illustrate the invention.

Viscosity is measured using a Brookfields DV-II+ viscometer, spindle NO. 7, setting 1 rpm according to the following protocol:

Homogenise sample
Put approximately 200 g in a high glass beaker
Lower spindle into sample
Start rotor and read out cP value, when value is stable.

Water activity is measured using an Aqualab CX-2 (Aw measurement instrument) according to the following protocol:

Homogenise sample
Place sample in sample cup
Allow sample to equilibrate for 15 min in cup
Put cup in instrument and start measurement
Read out Aw value when analysis has finished.

EXAMPLE 1

Production of a Water Continuous Peanut Butter Emulsion

A mixture of 38 wt. parts of corn syrup (DE 42) and 6 wt. parts of water was heated to 60° C. While the mixture was vigorously stirred, the following ingredients were slowly added: 2.5 wt. parts of tapioca starch, 0.6 wt. parts of cooking salt, 0.45 wt. parts of a (2:1) mixture of xanthan gum and locust bean gum, 2.5 wt. parts of stabilised egg yolk and 0.25 wt. parts of a colouring agent. When all ingredients had been dissolved, the solution was allowed to cool to below 40° C. Then 50 wt. parts of peanut butter (SKIPPY® Creamy Peanut Butter), which has been made pourable by heating to 40° C., were added at a rate of 5 wt. parts per minute, while vigorously stirring the mixture. The electrical conductivity was monitored to have a value being >800 µS which proves the emulsion remained to be water continuous. When peanut butter addition was complete, 0.8 wt. parts of flavour was admixed. The mixture was allowed to cool to ambient temperature resulting in a thick, plastic peanut butter emulsion.

EXAMPLE 2

Production and Assessment of a Baked Snack Comprising a Water Continuous Peanut Butter Emulsion A bread dough was prepared using the ingredients of Table I. The dry ingredients were mixed for 1 minute. The shortening, monoglyceride and flavour were added and mixed for additional 2 minutes. Then wet ingredients were added and mixed for 1 minute until a homogeneous dough was obtained.

TABLE I

| Dough Ingredients | Weight Parts |
| --- | --- |
| Flour | 100 |
| Salt | 1.75 |

TABLE I-continued

| Dough Ingredients | Weight Parts |
| --- | --- |
| Sugar | 11.35 |
| Non fat dry milk solids | 4.35 |
| Sodium bicarbonate | 2.50 |
| Leavening agent | 3.24 |
| Hydrocolloid | 1 |
| Shortening fat | 24 |
| Monoglyceride | 1 |
| High fructose corn syrup | 24 |
| Oat flakes | 20.75 |
| Water | 52 |
| Flavor | 0.42 |

The ready bread dough was rolled to a large flat sheet having a thickness of about 1.75–2.25 mm. From this sheet small 23 g pieces were cut having a size of about 8 cm×10 cm. A lump of peanut butter emulsion (16 g) prepared according to example 1 was placed on the dough. Weight ratio filling/dough was about 45/55. The dough was folded around the peanut butter so that a closed jacket was formed and the snack was baked at 205° C. for 9 minutes. The snack when cooled was cut and its contents inspected. A tasting panel assessed the peanut butter filling to have substantially retained its form, colour, texture and flavour and the desired creamy texture which is characteristic for peanut butter.

What is claimed is:

1. A process for the preparation of a filled dough containing a bake stable nut buffer emulsion which comprises the following steps:
    a) selecting a sugar syrup solution and diluting it with water until it contains an amount of sugar solids which is in the range 55–80 wt %,
    b) heating the solution to a temperature in the range 40–100°C.,
    c) dispersing a starch into the solution until it contains 1–5 wt % of dissolved starch,
    d) dispersing an emulsifier into the solution until it contains 0.5–3 wt % of dissolved emulsifier,
    e) dispersing a gelling agent into the solution until it contains 0.2–1 wt. % of dissolved gelling agent,
    f) cooling the solution to a temperature which is in the range of 20–50° C.,
    g) dispersing under vigorous stirring conditions a nut butter into the solution, while controlling the rate of addition such that the resulting emulsion remains water continuous,
    h) allowing the emulsion to coot and to obtain a plastic consistency,
    i) surrounding the filling with a suitable dough and baking it.

2. A process according to the claim 1 where the rate of nut butter addition does not exceed 18 wt. % of the total amount of nut butter per minute.

3. A process according to claim 1 which comprises having combined the nut butter filling with a filling consisting of fruit jelly which comprises 10–100 wt. % of fruity matter.

4. A process for the manufacture of a baked snack according to claim 1 wherein the water activity, Aw, of the dough as well as the filling has a value in the range 0.6 to 0.8.

5. A process for the manufactured of a baked snack according to claim 4 wherein the water activity, Aw, of the dough and the filling differ by less than 0.05 units.

* * * * *